United States Patent
Kumar et al.

(10) Patent No.: US 9,900,116 B2
(45) Date of Patent: Feb. 20, 2018

(54) TEST SEQUENCES USING UNIVERSAL TESTING SYSTEM

(71) Applicant: CONTEC, LLC, Schenectady, NY (US)

(72) Inventors: Samant Kumar, Schenectady, NY (US); Dinesh Kumar, Schenectady, NY (US); Ina Huh, Schenectady, NY (US); Jin Ryu, Schenectady, NY (US); Rajeev Tiwari, Schenectady, NY (US)

(73) Assignee: Contec, LLC, Schenectady, NY (US)

( * ) Notice: Subject to any disclaimer, the term of this patent is extended or adjusted under 35 U.S.C. 154(b) by 0 days.

(21) Appl. No.: 14/987,538

(22) Filed: Jan. 4, 2016

(65) Prior Publication Data

US 2017/0195071 A1 Jul. 6, 2017

(51) Int. Cl.
*H04B 17/00* (2015.01)
*H04B 17/30* (2015.01)

(52) U.S. Cl.
CPC ................................. *H04B 17/30* (2015.01)

(58) Field of Classification Search
CPC .................................................... H04B 17/30
USPC ................... 455/67.11, 423, 67.12, 115.1
See application file for complete search history.

(56) References Cited

U.S. PATENT DOCUMENTS

| | | | |
|---|---|---|---|
| 5,005,197 A | 4/1991 | Parsons et al. | |
| 5,897,609 A | 4/1999 | Choi et al. | |
| 5,917,808 A | 6/1999 | Kosbab | |
| 6,088,582 A | 7/2000 | Canora et al. | |
| 6,308,496 B1 | 10/2001 | Lee | |
| 6,367,032 B1 | 4/2002 | Kasahara | |
| 6,662,135 B1 | 12/2003 | Burns | |
| 6,671,160 B2 | 12/2003 | Hayden | |
| 6,826,512 B2 | 11/2004 | Dara-Abrams | |
| 6,859,043 B2 | 2/2005 | Ewing | |
| 7,664,317 B1 | 2/2010 | Sowerby | |
| 7,809,517 B1 | 10/2010 | Zuckerman | |
| 8,121,028 B1 | 2/2012 | Schlesener | |
| 8,209,732 B2 | 6/2012 | Le et al. | |
| 8,229,344 B1 | 7/2012 | Petersen | |
| 8,324,909 B2 | 12/2012 | Oakes et al. | |
| 8,418,000 B1 | 4/2013 | Salame | |
| 8,418,219 B1 | 4/2013 | Parsons et al. | |
| 8,515,015 B2 | 8/2013 | Maffre | |
| 8,689,071 B2 | 4/2014 | Valakh | |
| 8,806,400 B1 | 8/2014 | Bhawmik | |

(Continued)

FOREIGN PATENT DOCUMENTS

| | | |
|---|---|---|
| CN | 202261360 | 5/2012 |
| WO | 2001013604 | 2/2001 |

(Continued)

OTHER PUBLICATIONS

Kumar, Samant; Issue Notification for U.S. Appl. No. 14/866,780, filed Sep. 25, 2015, dated Oct. 19, 2016, 1 pg.

(Continued)

*Primary Examiner* — Md Talukder
(74) *Attorney, Agent, or Firm* — Taylor English Duma LLP

(57) ABSTRACT

A testing system that provides a separate set of virtualization container probes for each of at least a subset of devices that is under testing can perform Wifi Layer 2 and Wifi Layer 3 tests in a manner that minimizes or avoids wireless interference is disclosed.

6 Claims, 10 Drawing Sheets

(56) References Cited

U.S. PATENT DOCUMENTS

| | | | |
|---|---|---|---|
| 9,013,307 B2 | 4/2015 | Hussain | |
| 9,270,983 B1 | 2/2016 | Hare, Jr. | |
| 9,316,714 B2 | 4/2016 | Rada | |
| 9,319,908 B2 | 4/2016 | Nickel | |
| 9,372,228 B2 | 6/2016 | Nickel | |
| 9,402,601 B1* | 8/2016 | Berger | A61B 8/4472 |
| 9,490,920 B2 | 11/2016 | Parte | |
| 9,491,454 B1 | 11/2016 | Kumar | |
| 9,571,211 B2 | 2/2017 | Partee | |
| 9,810,735 B2 | 11/2017 | Kumar et al. | |
| 9,838,295 B2 | 12/2017 | Kumar et al. | |
| 2002/0070725 A1 | 6/2002 | Hilliges | |
| 2002/0077786 A1 | 6/2002 | Vogel et al. | |
| 2003/0005380 A1 | 1/2003 | Nguyen | |
| 2003/0184035 A1 | 10/2003 | Yu | |
| 2004/0010584 A1 | 1/2004 | Peterson | |
| 2004/0016708 A1 | 1/2004 | Rafferty | |
| 2004/0160226 A1 | 8/2004 | Ewing | |
| 2004/0189281 A1 | 9/2004 | Le et al. | |
| 2005/0041642 A1 | 2/2005 | Robinson | |
| 2005/0053008 A1 | 3/2005 | Griesing | |
| 2005/0102488 A1 | 5/2005 | Bullis | |
| 2005/0193294 A1 | 9/2005 | Hildebrant | |
| 2005/0286466 A1 | 12/2005 | Tagg | |
| 2006/0015785 A1 | 1/2006 | Chun | |
| 2006/0271322 A1 | 11/2006 | Haggerty | |
| 2007/0097659 A1 | 5/2007 | Behrens | |
| 2007/0220380 A1 | 9/2007 | Ohanyan | |
| 2008/0117907 A1 | 5/2008 | Hein | |
| 2008/0144293 A1 | 6/2008 | Aksamit | |
| 2008/0159737 A1 | 7/2008 | Noble et al. | |
| 2008/0168520 A1 | 7/2008 | Vanderhoff | |
| 2008/0274712 A1 | 11/2008 | Rofougaran | |
| 2008/0315898 A1 | 12/2008 | Cannon | |
| 2009/0089854 A1 | 4/2009 | Le | |
| 2009/0282446 A1 | 11/2009 | Breed | |
| 2009/0282455 A1 | 11/2009 | Bell et al. | |
| 2009/0289020 A1 | 11/2009 | Wurmhoringer | |
| 2010/0132000 A1* | 5/2010 | Straub | H04N 5/50 725/117 |
| 2010/0138823 A1 | 6/2010 | Thornley | |
| 2010/0246416 A1* | 9/2010 | Sinha | H04W 24/06 370/250 |
| 2011/0001833 A1 | 1/2011 | Grinkemeyer | |
| 2011/0006794 A1 | 1/2011 | Sellathamby | |
| 2011/0012632 A1 | 1/2011 | Merrow | |
| 2011/0035676 A1 | 2/2011 | Tischer | |
| 2011/0072306 A1 | 3/2011 | Racey | |
| 2011/0090075 A1 | 4/2011 | Armitage et al. | |
| 2011/0099424 A1 | 4/2011 | Rivera Trevino | |
| 2011/0116419 A1 | 5/2011 | Cholas | |
| 2011/0222549 A1 | 9/2011 | Connelly | |
| 2011/0267782 A1 | 11/2011 | Petrick et al. | |
| 2011/0306306 A1* | 12/2011 | Reed | H04B 17/0085 455/67.11 |
| 2012/0140081 A1 | 1/2012 | Clements | |
| 2012/0122406 A1 | 5/2012 | Gregg et al. | |
| 2012/0163227 A1 | 6/2012 | Kannan | |
| 2012/0198084 A1 | 8/2012 | Keskitalo | |
| 2012/0198442 A1 | 8/2012 | Kashyap | |
| 2012/0213259 A1 | 8/2012 | Renken et al. | |
| 2012/0220240 A1* | 8/2012 | Rothschild | H04W 24/08 455/67.11 |
| 2012/0275784 A1 | 11/2012 | Soto | |
| 2012/0278826 A1 | 11/2012 | Jones | |
| 2013/0033279 A1 | 2/2013 | Sozanski | |
| 2013/0049794 A1 | 2/2013 | Humphrey et al. | |
| 2013/0076217 A1 | 3/2013 | Thompson | |
| 2013/0093447 A1 | 4/2013 | Nickel | |
| 2013/0104158 A1* | 4/2013 | Partee | H04H 60/32 725/14 |
| 2013/0160064 A1 | 6/2013 | Van Rozen | |
| 2013/0167123 A1 | 6/2013 | Dura | |
| 2013/0257468 A1 | 10/2013 | Mlinarsky | |
| 2013/0305091 A1 | 11/2013 | Stan et al. | |
| 2014/0091874 A1 | 4/2014 | Cook et al. | |
| 2014/0115580 A1 | 4/2014 | Kellerman | |
| 2014/0123200 A1 | 5/2014 | Park et al. | |
| 2014/0126387 A1 | 5/2014 | Gintis | |
| 2014/0156819 A1 | 6/2014 | Cavgalar | |
| 2014/0187172 A1* | 7/2014 | Partee | H04L 43/045 455/67.12 |
| 2014/0187173 A1* | 7/2014 | Partee | H04B 17/00 455/67.12 |
| 2014/0207404 A1 | 7/2014 | Fritzsche | |
| 2014/0256373 A1* | 9/2014 | Hernandez | H04B 17/12 455/509 |
| 2014/0266930 A1 | 9/2014 | Huynh | |
| 2014/0269871 A1 | 9/2014 | Huynh | |
| 2014/0282783 A1 | 9/2014 | Totten | |
| 2014/0370821 A1 | 12/2014 | Guterman | |
| 2015/0024720 A1 | 1/2015 | Efrati | |
| 2015/0093987 A1 | 4/2015 | Ouyang et al. | |
| 2015/0109941 A1 | 4/2015 | Zhang | |
| 2015/0151669 A1* | 6/2015 | Meisner | B60Q 1/085 701/49 |
| 2015/0180743 A1 | 6/2015 | Jana et al. | |
| 2015/0226716 A1 | 8/2015 | Nelson | |
| 2015/0237010 A1* | 8/2015 | Roskind | H04L 63/029 713/170 |
| 2015/0253357 A1 | 9/2015 | Olgaard | |
| 2015/0288589 A1 | 10/2015 | Radford et al. | |
| 2015/0369851 A1 | 12/2015 | Even | |
| 2016/0080241 A1* | 3/2016 | Rocha De Maria | H04L 43/50 370/252 |
| 2016/0102951 A1 | 4/2016 | Cole | |
| 2016/0191364 A1 | 6/2016 | Ajitomi | |
| 2016/0381818 A1 | 12/2016 | Mills | |
| 2017/0048519 A1 | 2/2017 | Friel | |
| 2017/0089981 A1 | 3/2017 | Kumar | |
| 2017/0093682 A1 | 3/2017 | Kumar | |
| 2017/0093683 A1 | 3/2017 | Kumar | |
| 2017/0126536 A1 | 5/2017 | Kumar | |
| 2017/0126537 A1 | 5/2017 | Kumar | |
| 2017/0126539 A1 | 5/2017 | Tiwari | |
| 2017/0149635 A1 | 5/2017 | Kumar | |
| 2017/0149645 A1 | 5/2017 | Kumar | |
| 2017/0250762 A1 | 8/2017 | Kumar et al. | |
| 2017/0288791 A1 | 10/2017 | Kumar et al. | |
| 2017/0288993 A1 | 10/2017 | Kumar et al. | |
| 2017/0289012 A1 | 10/2017 | Tiwari et al. | |
| 2017/0302994 A1 | 10/2017 | Kumar | |

FOREIGN PATENT DOCUMENTS

| | | |
|---|---|---|
| WO | 2013169728 | 11/2013 |
| WO | 2014035462 | 3/2014 |
| WO | 2014065843 | 5/2014 |
| WO | 2017053961 | 3/2017 |
| WO | 2017074872 | 5/2017 |

OTHER PUBLICATIONS

Kumar, Samant; Notice of Allowance for U.S. Appl. No. 14/866,780, filed Sep. 25, 2015, dated Jul. 19, 2016, 8 pgs.

Kumar, Samant; Non-Final Office Action for U.S. Appl. No. 14/866,720, filed Sep. 25, 2015, dated Jan. 23, 2017, 17 pgs.

Kumar, Samant; Non-Final Office Action for U.S. Appl. No. 15/057,085, filed Feb. 29, 2016, dated Apr. 7, 2017, 15 pgs.

Kumar, Samant; International Search Report and Written Opinion for PCT/US16/53768, filed Sep. 26, 2016, dated Feb. 3, 2017, 17 pgs.

Nordman, Bruce, "Testing Products with Network Connectivity," Jun. 21, 2011 [retrieved online at http://citeseerx.ist.psu.edu/viewdoc/download?doi=10.1.1.695.772&rep=rep1&type=pdf on Feb. 6, 2017], 20 pgs.

Kumar, Samant; International Search Report and Written Opinion for PCT/US2016/058507, filed Oct. 24, 2016, dated Jan. 3, 2017, 12 pgs.

Kumar, Samant; Notice of Allowance for U.S. Appl. No. 14/948,925, filed Nov. 23, 2015, dated Sep. 20, 2017, 15 pgs.

(56) References Cited

OTHER PUBLICATIONS

Kumar, Samant; Supplemental Notice of Allowance for U.S. Appl. No. 14/948,925, filed Nov. 23, 2015, dated Oct. 5, 2017, 2 pgs.
Kumar, Samant; Notice of Allowance for U.S. Appl. No. 15/057,085, filed Feb. 29, 2016, dated Sep. 29, 2017, 28 pgs.
Kumar, Samant; Non-Final Office Action for U.S. Appl. No. 14/866,630, filed Sep. 25, 2015, dated Mar. 9, 2017, 24 pgs.
Kumar, Samant; Notice of Allowance for U.S. Appl. No. 14/866,720, filed Sep. 25, 2015, dated Jun. 29, 2017, 26 pgs.
Kumar, Samant; Notice of Allowance for U.S. Appl. No. 14/866,720, filed Sep. 25, 2015, dated Aug. 28, 2017, 11 pgs.
Kumar, Samant; Response to Rule 312 Communication for U.S. Appl. No. 14/866,720, filed Sep. 25, 2015, dated Jul. 26, 2017, 2 pgs.
Kumar, Samant; Ex-Parte Quayle Office Action for U.S. Appl. No. 14/948,925, filed Nov. 23, 2015, dated Jun. 20, 2017, 29 pgs.
Kumar, Samant; Non-Final Office Action for U.S. Appl. No. 15/624,961, filed Jun. 16, 2017, dated Jul. 19, 2017, 7 pgs.
Kumar, Samant; Non-Final Office Action for U.S. Appl. No. 14/929,180, filed Oct. 30, 2015, dated Mar. 22, 2017, 32 pgs.
Kumar, Samant; Non-Final Office Action for U.S. Appl. No. 14/929,220, filed Oct. 30, 2015, dated Mar. 24, 2017, 31 pgs.
Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.
CED Magazine; Article entitled: "Cable Connects in Atlanta", located at <https://www.cedmagazine.com/article/2006/04/cable-connects-atlanta>, Apr. 30, 2006, 21 pgs.
TVTechnology; Article entitled: "S3 Group's StormTest", located at <http://www.tvtechnology.com/expertise/0003/s3-groups-stormtest/256690>, published May 1, 2012, 2 pgs.
Digital Producer; Article entitled: "S3 Group Unveils Exclusive Partnership in North America With First US Stormiest(TM) Decision Line Customer", located at <http://www.digitalproducecom/article/S3-Group-Unveils-Exclusive-Partnership-in-North-America-With-First-US-StormTest(TM)-Decision-Line-Customer--1668213>, Sep. 8, 2011, 3 pgs.
Electronic Design; Article entitled: "Testing of MPEG-2 Set-Top Boxes Must be Fast, Thorough", located at <http://www.electronicdesign.com/print/839>, published Nov. 18, 2001, 9 pgs.
Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date -May 30, 2013, 2 pgs.
S3 Group; Document entitled: "White Paper: The Importance of Automated Testing in Set-Top Box Integration", earliest known publication date Jun. 17, 2014, 11 pgs.
Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.
Teleplan; Article entitled: "Screening & Testing", located at <https://www.teleplan.com/innovative-services/screening-testing/>, earliest known publication date Mar. 21, 2015, 7 pgs.
Kumar, Samant; Non-Final Office Action for U.S. Appl. No. 15/642,915, filed Jul. 6, 2017, dated Nov. 1, 2017, 42 pgs.
Kumar, Samant; Notice of Allowance for U.S. Appl. No. 14/866,630, filed Sep. 25, 2015, dated Dec. 20, 2017, 19 pgs.
Kumar, Samant; Non-Final Office Action for U.S. Appl. No. 14/866,752, filed Sep. 25, 2015, dated Nov. 7, 2017, 26 pgs.
Kumar, Samant; Issue Notification for U.S. Appl. No. 14/866,720, filed Sep. 25, 2015, dated Oct. 18, 2017, 1 pg.
Kumar, Samant; Issue Notification for U.S. Appl. No. 14/948,925, filed Nov. 23, 2015, dated Nov. 16, 2017, 1 pg.
Kumar, Samant; Non-Final Office Action for U.S. Appl. No. 14/948,143, filed Nov. 20, 2015, Dec. 28, 2017, 39 pgs.
Kumar, Samant; Corrected Notice of Allowance for U.S. Appl. No. 15/057,085, filed Feb. 29, 2016, dated Oct. 31, 2017, 6 pgs.
Tiwari, Rajeev; Non-Final Office Action for U.S. Appl. No. 15/348,920, filed Nov. 10, 2016, dated Nov. 20, 2017, 53 pgs.
Tiwari, Rajeev; Non-Final Office Action for U.S. Appl. No. 15/624,967, filed Jun. 16, 2017, dated Nov. 7, 2017, 52 pgs.

* cited by examiner

TEST SEQUENCES USING UNIVERSAL TESTING SYSTEM

CROSS REFERENCE TO RELATED APPLICATIONS

This application is related to U.S. patent application Ser. No. 14/866,720 entitled "Core Testing Machine," filed Sep. 25, 2015, now U.S. Pat. No. 9,810,735, and to U.S. patent application Ser. No. 14/866,752 entitled "Universal Device Testing Interface," filed Sep. 25, 2015 and published Mar. 30, 2017 as U.S. Patent Application Publication No. 2017/0093683, and to U.S. patent application Ser. No. 14/866,630 entitled "Universal Device Testing System," filed Sep. 25, 2015 and published Mar. 30, 2017 as U.S. Patent Application Publication No. 2017/0093682, and to U.S. patent application Ser. No. 14/866,780 entitled "Set Top Boxes Under Test," filed Sep. 25, 2015, now U.S. Pat. No. 9,491,454, and to U.S. patent application Ser. No. 14/948,143 entitled "Cable Modems/eMTAs Under Test," filed Nov. 20, 2015 and published May 25, 2017 as U.S. Patent Application Publication No. 2017/0149635, and to U.S. patent application Ser. No. 14/929,180 entitled "Hardware Architecture for Universal Testing System: Cable Modem Test," filed Oct. 30, 2015 and published May 4, 2017 as U.S. Patent Application Publication No. 2017/0126536, and to U.S. patent application Ser. No. 14/929,220 entitled "Hardware Architecture for Universal Testing System: Wireless Router Test," filed Oct. 30, 2015 and published May 4, 2017 as U.S. Patent Application Publication No. 2017/0126537, and to U.S. patent application Ser. No. 14/948,925 entitled "Wireless Routers Under Test," filed Nov. 23, 2015, now U.S. Pat. No. 9,838,295, each of which is hereby incorporated by reference in its entirety.

TECHNICAL FIELD

The present invention is directed to a system for testing devices.

BRIEF DESCRIPTION OF THE DRAWINGS

For a better understanding of the various embodiments of the invention, reference should be made to the description of embodiments below, in conjunction with the following drawings in which like reference numerals refer to corresponding parts throughout the figures.

DETAILED DESCRIPTION

Figure 1:
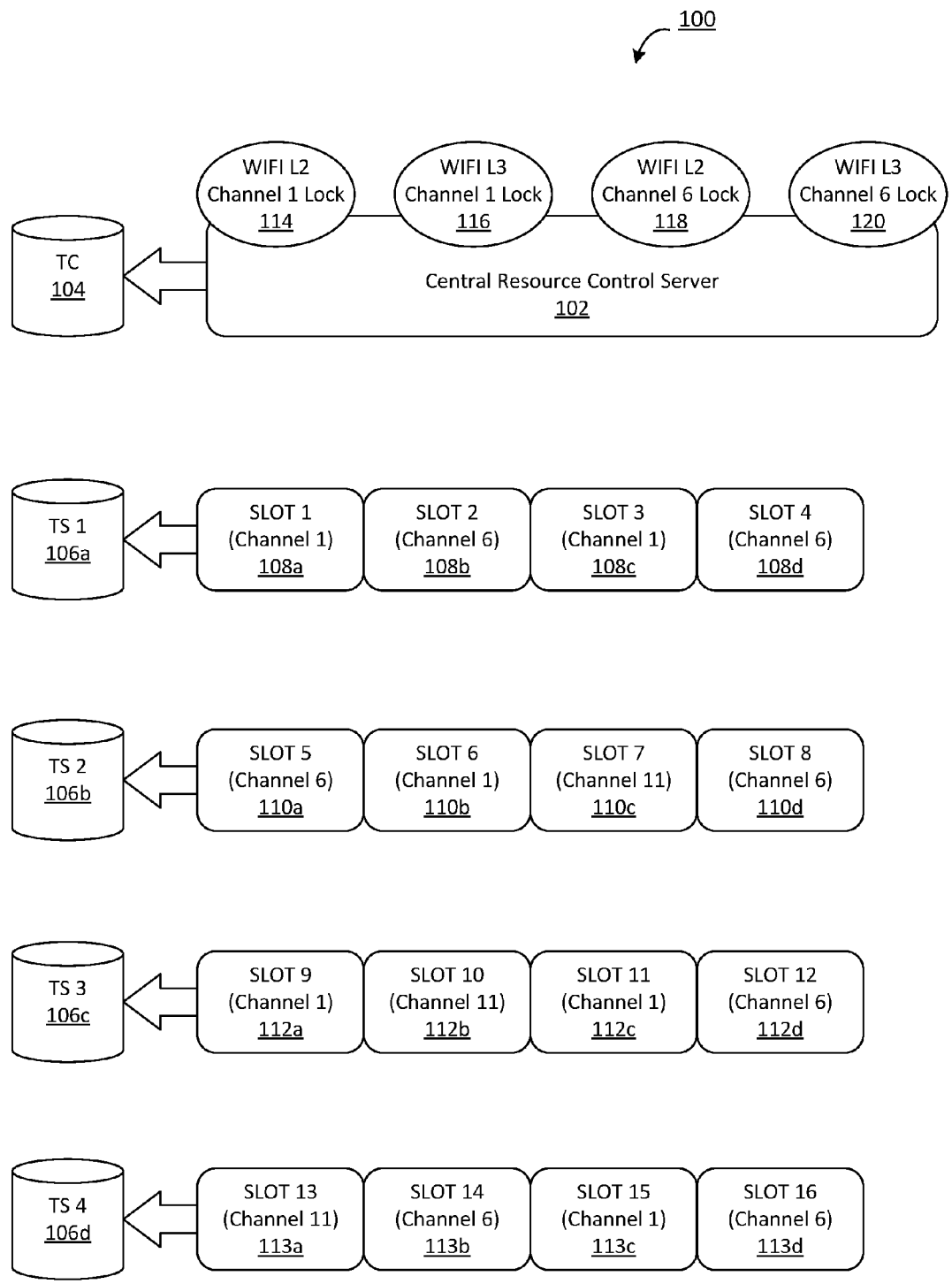
FIG. 1 illustrates a high-level schematic of a test station for testing devices such as wireless devices, according to certain embodiments.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, a central resource control server controls resources such as locks on Wifi resources (herein also referred to as "Wifi resource lock"). Non-limiting examples of Wifi resource locks include locks on resources for Wifi L2 (Layer 2) tests, Wifi L3 (Layer 3) tests and DOCSIS (Data Over Cable Service Interface Specification) tests. For example, a Wifi L2 resource lock involves a lock on resources for the Address Resolution Protocol (ARP) test. Another example of a Wifi L2 resource lock involves a lock on resources for a Wifi connecting card test. A non-limiting example of a Wifi L3 resource lock involves a lock on resources for a Wifi speed test. A non-limiting example of a DOCSIS resource lock involves a lock on resources for a DOCSIS speed test. Layer 2 and Layer 3 refer to the layers in the OSI model (Open System Interconnection model). Layer 2 is the data link layer of the OSI model. Layer 3 is the network layer of the OSI model.

According to certain embodiments, a testing system that provides a separate set of interfaces for each device (of a plurality of devices) that is under testing can perform Wifi L2 and Wifi L3 tests in a manner that minimizes or avoids wireless interference.

According to certain embodiments, the testing system minimizes or avoids wireless interference by controlling locks on Wifi frequency channels.

According to certain embodiments, the testing system comprises at least one test station. According to certain embodiments, each test station includes a plurality of physical slots for testing devices. As a non-limiting example, a subset of the plurality of physical slots is associated with a corresponding test server. As a non-limiting example, a test station may have four test servers, each of which is associated with a set of four physical slots of the plurality of physical slots. The embodiments are not restricted to four test servers and four physical slots per test server. The number of test servers and physical slots may vary from implementation to implementation. According to certain embodiments, each test server includes virtualization containers that act as probes for testing devices installed in the physical slots in the test station.

According to certain embodiments, the testing system includes a central resource control server running on at least one test control computer.

According to certain embodiments, each physical slot on the test station is assigned a specific frequency Channel on the Wifi frequency band. For the Wifi 2.4 GHz band, a given physical slot can be assigned any of the frequency Channels 1, 6, 11 (these channels are non-overlapping), according to certain embodiments. For the Wifi 5.0 GHz band, a given physical slot can be assigned any of the frequency Channels 36, 40, 44, 48, 149, 153, 157, 161, according to certain embodiments. Such resources (Wifi frequency Channels) are shared across the test servers and associated slots of the test station.

According to certain embodiments, each slot of the test station is assigned a frequency Channel in a manner to minimize wireless interference between the slots.

According to certain embodiments, only one Wifi L3 test can be performed per Channel in the test station.

According to certain embodiments, the central resource control server determines whether to grant Wifi resources to a given slot on a test station when the given slot requests a Wifi resource. As a non-limiting example, a given slot on the test station may request a lock on frequency Channel for performing a Wifi L2 test or for performing a Wifi L3 test.

According to certain embodiments, the central resource control server determines whether to grant locks (on a given Channel), release locks and block slots from running specific Wifi tests based on certain criteria.

The Wifi frequency band may vary from implementation to implementation.

For ease of explanation, FIG. 1 to FIG. 10 are described with reference to the Wifi 2.4 GHz band. The embodiments are not restricted to the Wifi 2.4 GHz band. Further, FIG. 1 to FIG. 10 are described using example test scenarios comprising sample requests from a sample subset of slots for Wifi resource locks. Such test scenarios are merely examples that help illustrate features of the embodiments. Such examples are to be regarded in an illustrative rather than a restrictive sense. Other examples may include different requests from a different sample subset of slots for Wifi resource locks.

FIG. 1 illustrates a high-level schematic of a test station for testing devices such as wireless devices, according to certain embodiments. FIG. 1 shows a test station 100. According to certain embodiments, test station 100 comprises a central resource control server 102 that runs on a test control computer 104. Test station 100 further comprises a plurality of test servers 106a, 106b, 106c, 106d. Test station 100 comprises a plurality of physical slots. According to certain embodiments, each test sever is associated with four physical slots but the embodiments are not restricted to four slots per test server. For example, test server 106a is associated with physical slots such as Slot 1 (108a), Slot 2 (108b), Slot 3 (108c), Slot 4 (108d). Test server 106b is associated with physical slots such as Slot 5 (110a), Slot 6 (110b), Slot 7 (110c), Slot 8 (110d). Test server 106c is associated with physical slots such as Slot 9 (112a), Slot 10 (112b), Slot 11 (112c), Slot 12 (112d). Test server 106d is associated with physical slots such as Slot 13 (113a), Slot 14 (113b), Slot 15 (113c), Slot 16 (113d). According to certain embodiments, central resource control server 102 controls Wifi resources such as Wifi L2 Channel 1 lock (114), Wifi L3 Channel 1 lock (116), Wifi L2 Channel 6 lock (118), and Wifi L3 Channel 6 lock (120), According to certain embodiments, each physical slot is assigned a Channel. For example, Slot 1 (108a) is assigned Channel 1, Slot 2 (108b) is assigned Channel 6, Slot 3 (108c) is assigned Channel 1, Slot 4 (108d) is assigned Channel 6, Slot 5 (110a) is assigned Channel 6, Slot 6 (110b) is assigned Channel 1, Slot 7 (110c) is assigned Channel 11, Slot 8 (110d) is assigned Channel 6, Slot 9 (112a) is assigned Channel 1, Slot 10 (112b) is assigned Channel 11, Slot 11 (112c) is assigned Channel 1, Slot 12 (112d) is assigned Channel 6, Slot 13 (113a) is assigned Channel 11, Slot 14 (113b) is assigned Channel 6, Slot 15 (113c) is assigned Channel 1, Slot 16 (113d) is assigned Channel 6, according to certain embodiments.

When a given slot has a Wifi device installed in the given slot for testing, the given slot requests for a Wifi resource lock from central resource control server 102 in order to perform a relevant wireless test on the installed device. According to certain embodiments, central resource control server 102 grants Wifi resource locks in manner that minimizes interference between the various wireless tests that are running in the slots in test station 100.

Figure 2:
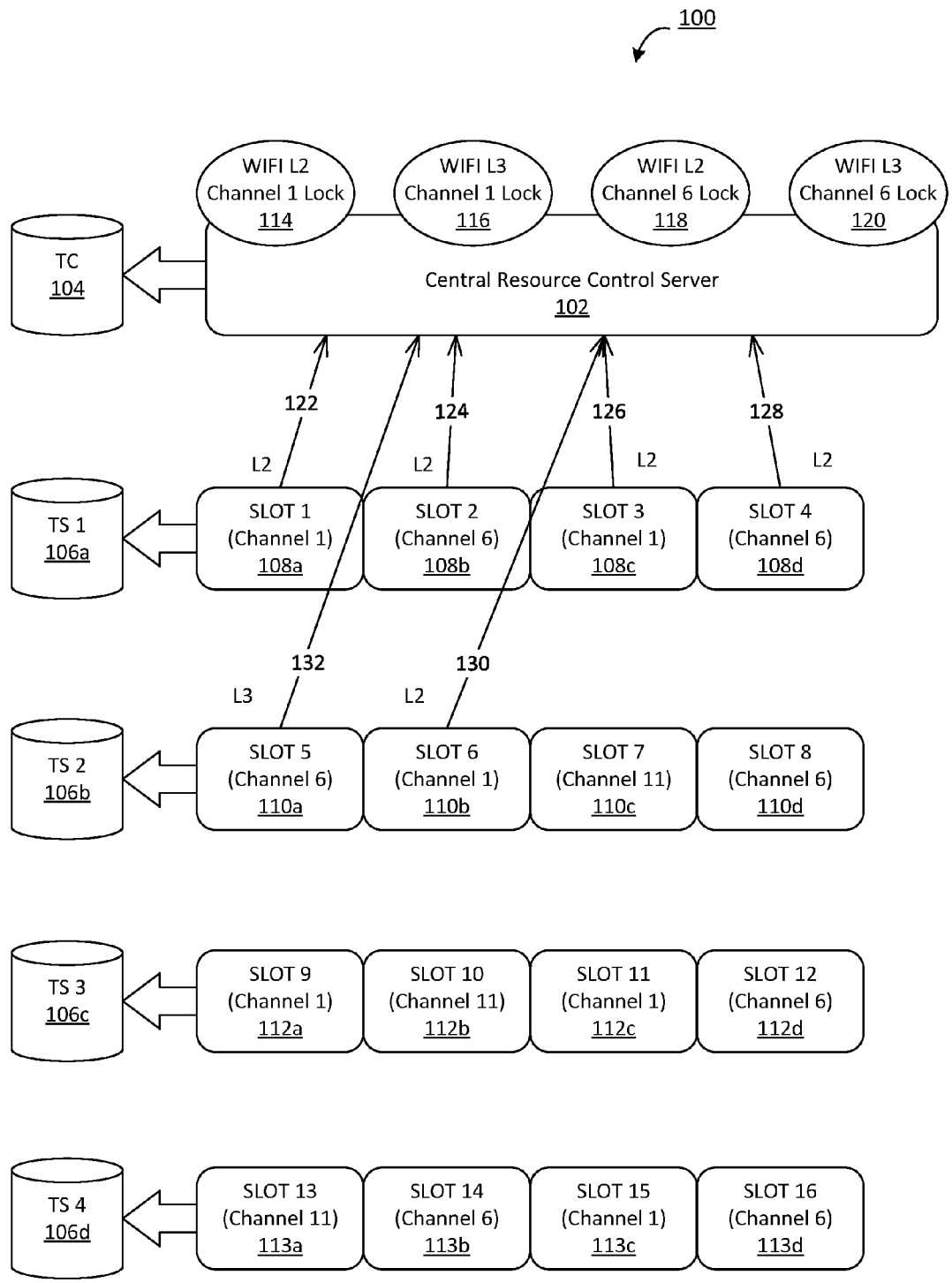
FIG. 2 illustrates requests for Wifi resource locks, according to certain embodiments.

FIG. 2 illustrates requests for Wifi resource locks, according to certain embodiments. Slot 1 (108a) requests (122) a lock on frequency Channel 1 in order to perform a Wifi L2 test on a device installed in Slot 1 for testing. Slot 2 (108b) requests (124) a lock on frequency Channel 6 in order to perform a Wifi L2 test on a device installed in Slot 2 for testing. Slot 3 (108c) requests (126) a lock on frequency Channel 1 in order to perform a Wifi L2 test on a device installed in Slot 3 for testing. Slot 4 (108d) requests (128) a lock on frequency Channel 6 in order to perform a Wifi L2 test on a device installed in Slot 4 for testing. Slot 5 (110a) requests (132) a lock on frequency Channel 6 in order to perform a Wifi L3 test on a device installed in Slot 5 for testing. Slot 6 (110b) requests (130) a lock on frequency Channel 1 in order to perform a Wifi L2 test on a device installed in Slot 6 for testing. The above requests from the slots for locks on frequency Channels are sent to central resource control server 102.

Figure 3:
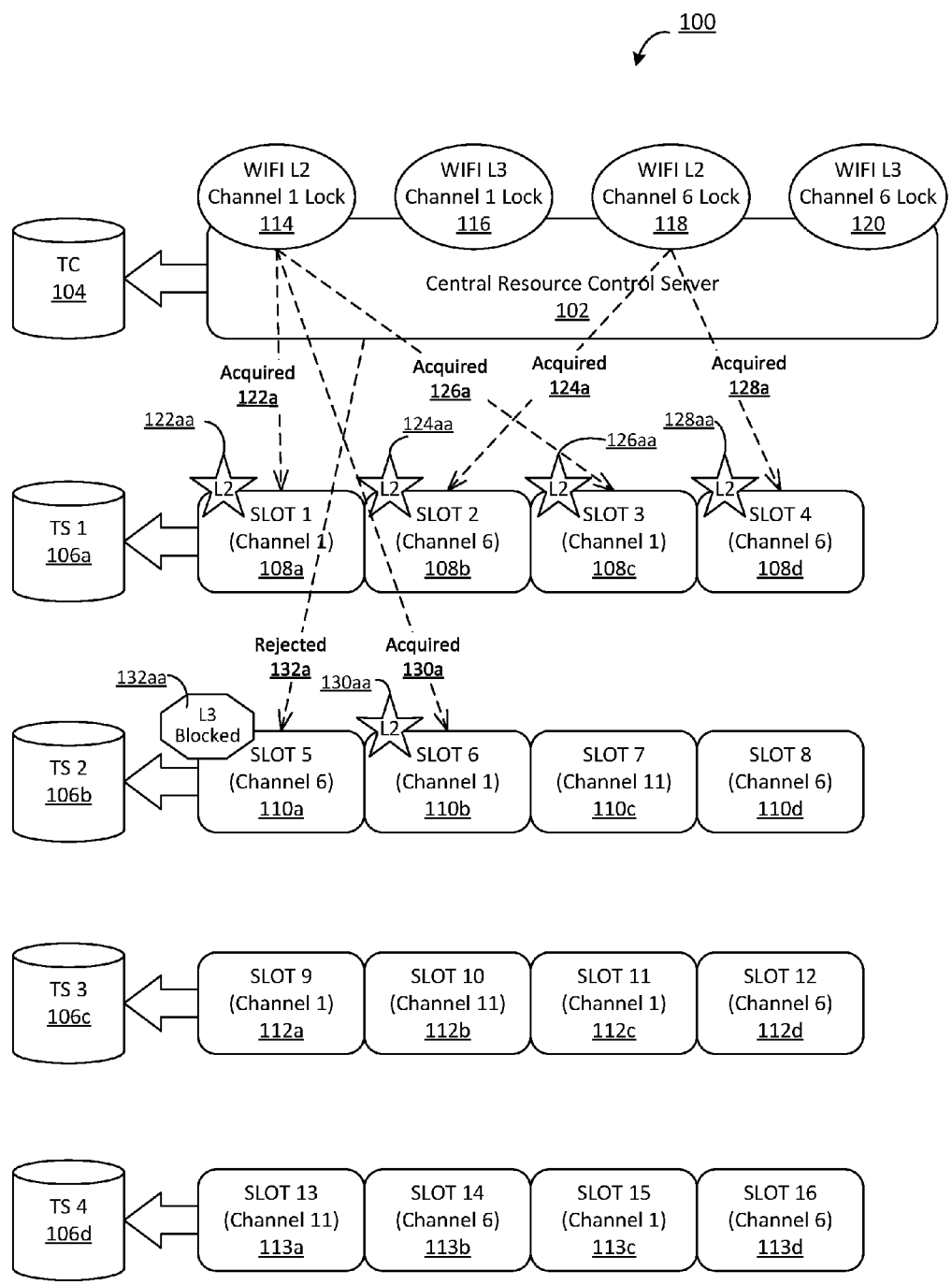
FIG. 3 illustrates the response by the central resource control server to the requests from the slots in the test station, according to certain embodiments.

FIG. 3 illustrates the response by central resource control server 102 to the requests from the slots in the test station, according to certain embodiments. According to certain embodiments, central resource control server 102 grants all the requests for locks for a given frequency Channel with respect to Wifi L2 tests as long as there is no ongoing Wifi L3 test for the given frequency Channel, as illustrated by FIG. 3. FIG. 3 shows that Slot 1 (108a) is granted (122a) a lock (122aa) on frequency Channel 1 by central resource control server 102 in order to perform a Wifi L2 test on a device installed in Slot 1 for testing. Similarly, Slot 2 (108b) is granted (124a) a lock (124aa) on frequency Channel 6 in order to perform a Wifi L2 test on a device installed in Slot 2 for testing. Slot 3 (108c) is granted (126a) a lock (126aa) on frequency Channel 1 in order to perform a Wifi L2 test on a device installed in Slot 3 for testing. Slot 4 (108d) is granted (128a) a lock (128aa) on frequency Channel 6 in order to perform a Wifi L2 test on a device installed in Slot 4 for testing. Slot 6 (110b) is granted (130a) a lock (130aa) on frequency Channel 1 in order to perform a Wifi L2 test on a device installed in Slot 6 for testing.

However, Slot 5 (110a) is not granted (132a) a lock (blocked 132aa) on frequency Channel 6 in order to perform a Wifi L3 test on a device installed in Slot 5 for testing. Slot 5 (110a) is not granted (132a) a lock on frequency Channel 6 because a Wifi L3 test can only be run in a given Channel if there are no other tests running in the same Channel at a given time. In this example, Slot 5 (110*a*) cannot be granted (132*a*) a lock on frequency Channel 6 for a Wifi L3 test because Slot 2 (108*b*), and Slot 4 (108*d*) have already been granted locks on frequency Channel 6 for performing their respective Wifi L2 tests. Thus, Slot 5 (110*a*) needs to request a lock on frequency Channel 6 to perform a Wifi L3 test at a later time, according to certain embodiments. According to certain other embodiments, Slot 5 (110*a*) can keep its request for the lock pending in a request queue. Central resource control server 102 will grant locks based on the next request in the queue as long the lock grant does not cause more than one Wifi L3 test to be run per frequency Channel.

Figure 4:
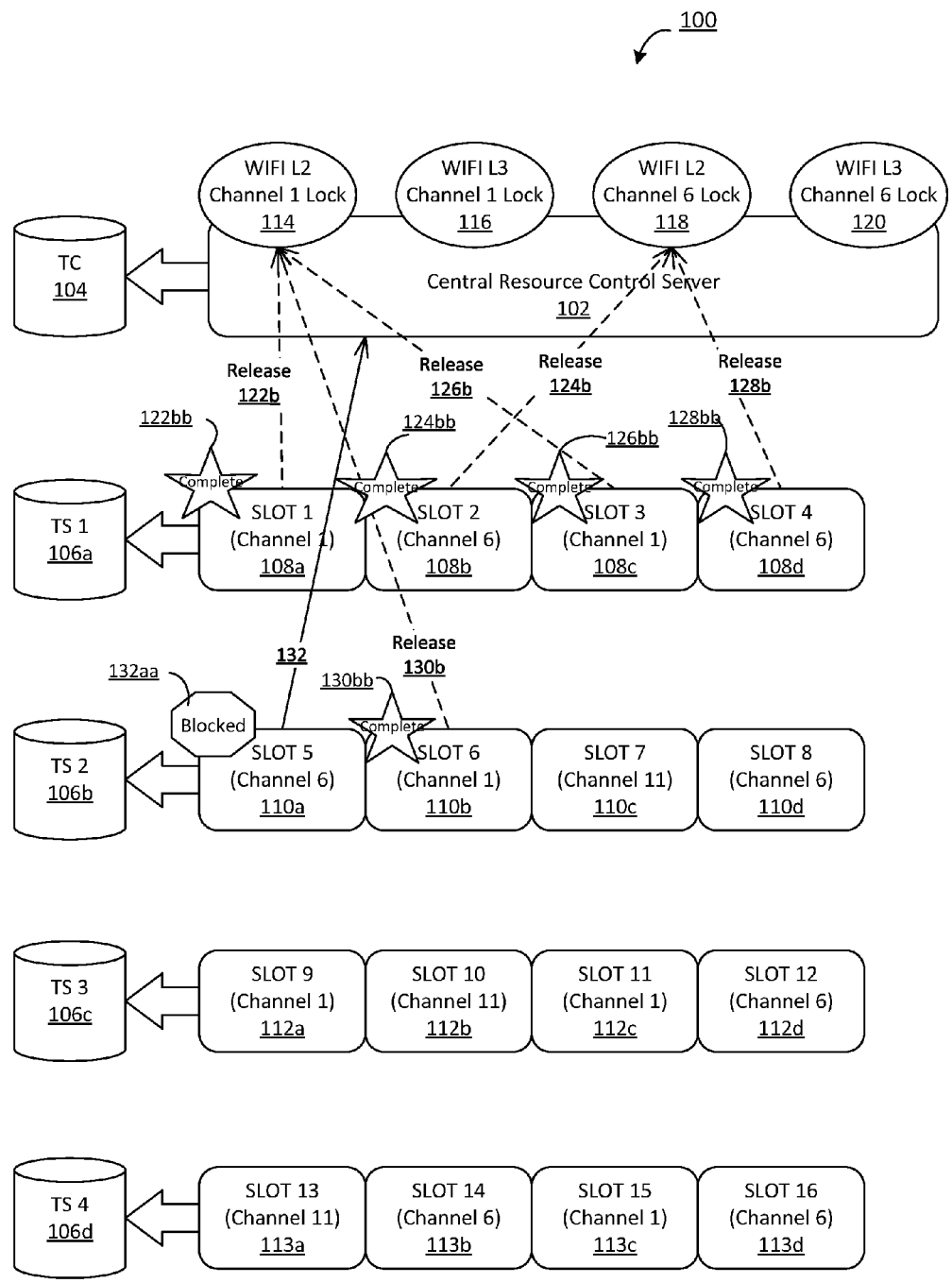
FIG. 4 illustrates the release of locks on frequency Channels for Wifi tests, according to certain embodiments.

FIG. 4 illustrates the release of locks on frequency Channels for Wifi tests, according to certain embodiments. FIG. 4 shows that once a given slot completes its respective Wifi test, the given slot releases its lock on the frequency Channel that it was granted to perform the Wifi test or the given slot sends information to central resource control server 100 that the given lock can be released. FIG. 4 shows that Slot 1 (108*a*) releases (122*b*) its lock on frequency Channel 1 because it has completed (122*bb*) the Wifi L2 test on a device installed in Slot 1 for testing. Slot 2 (108*b*) releases (124*b*) its lock on frequency Channel 6 because it has completed (124*bb*) the Wifi L2 test on a device installed in Slot 2 for testing. Slot 3 (108*c*) releases (126*b*) its lock on frequency Channel 1 because it has completed (126*bb*) the Wifi L2 test on a device installed in Slot 3 for testing. Slot 4 (108*d*) releases (128*b*) its lock on frequency Channel 6 because it has completed (128*bb*) the Wifi L2 test on a device installed in Slot 4 for testing. Slot 6 (110*b*) releases (130*b*) its lock on frequency Channel 1 because it has completed (130*bb*) the Wifi L2 test on a device installed in Slot 6 for testing. Each of such slots sends information on test completion to central resource control server 102, according to certain embodiments.

The request from Slot 5 (110*a*) for a lock on frequency Channel 6 was previously blocked (132*aa*). However, Slot 5 (110*a*) can again request (132) for a lock on Channel 6 to perform a Wifi L3 test now that the other locks on Channel 6 are released, according to certain embodiments.

Figure 5:
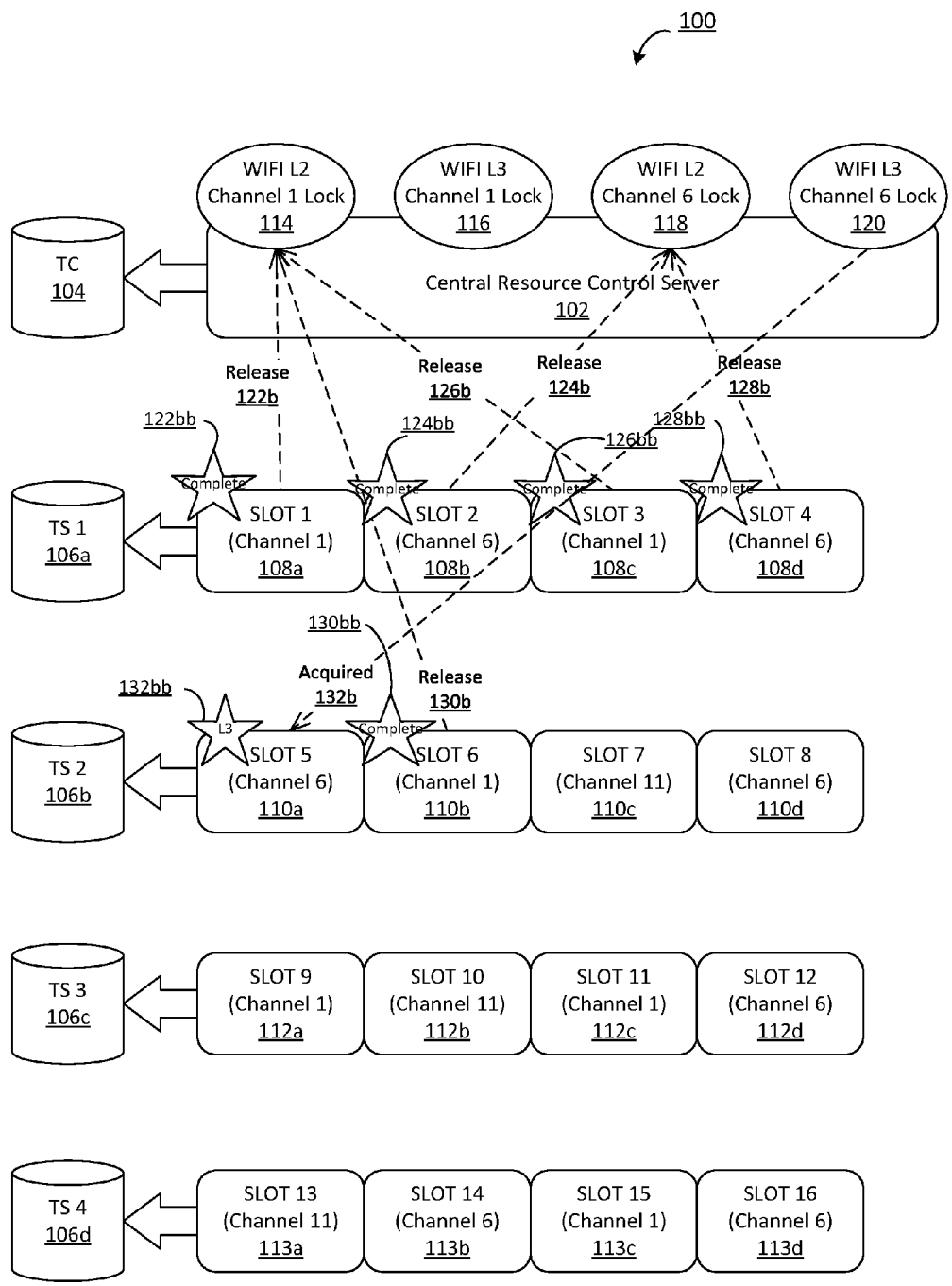
FIG. 5 illustrates the granting of a lock on a frequency Channel to a given slot for performing a Wifi L3 test, according to certain embodiments.

FIG. 5 illustrates the granting of a lock on a frequency Channel to a given slot for performing a Wifi L3 test, according to certain embodiments. FIG. 5 shows that central resource control server 102 grants (132*b*) the request from Slot 5 (110*a*) for a lock (132*bb*) on Channel 6 to perform a Wifi L3 test now that the other locks on Channel 6 are released, according to certain embodiments.

Figure 6:
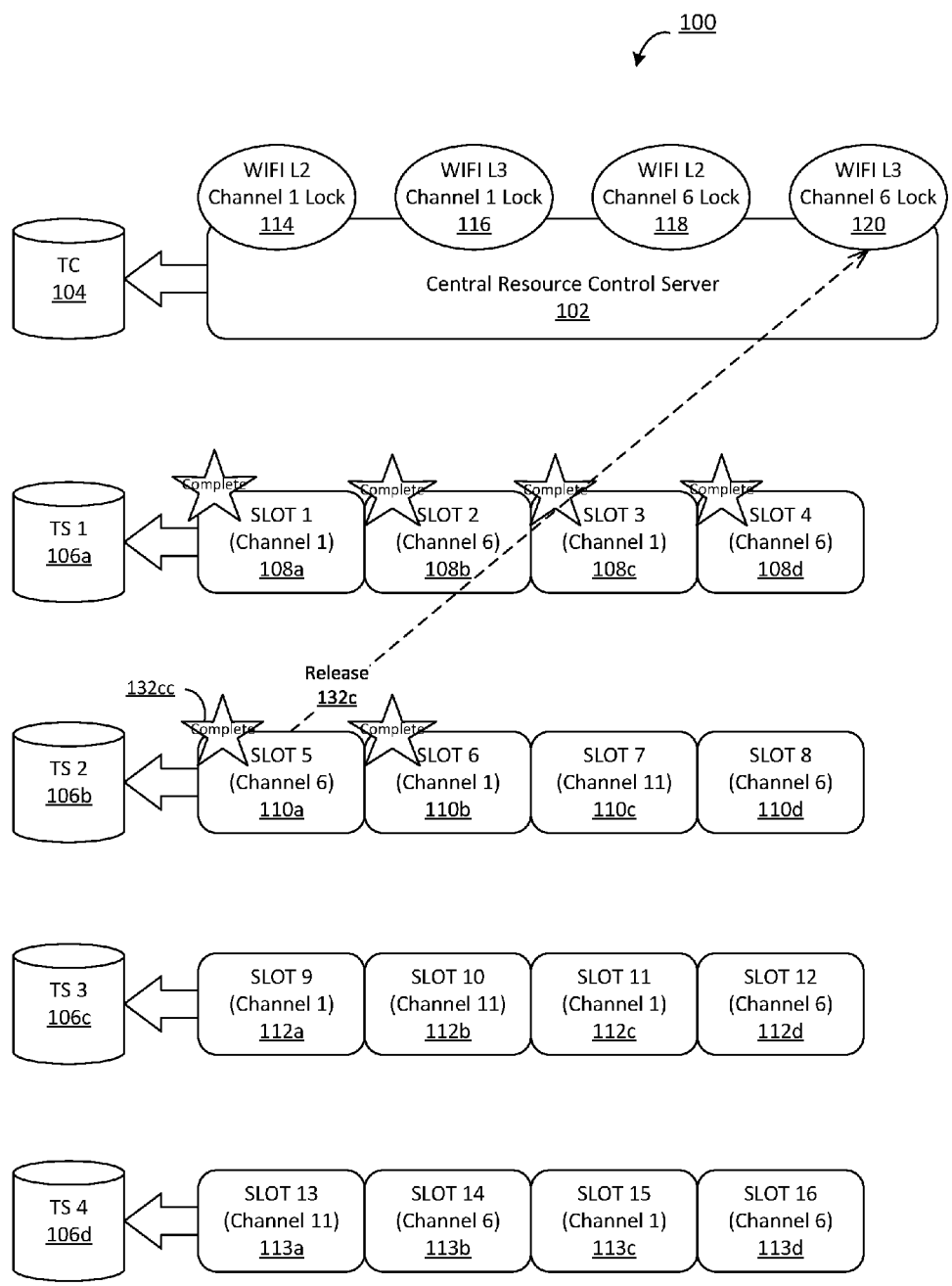
FIG. 6 illustrates the release of a lock on a frequency Channel for a Wifi L3 test, according to certain embodiments.

FIG. 6 illustrates the release of a lock on a frequency Channel for a Wifi L3 test, according to certain embodiments. FIG. 6 shows that once Slot 5 (110*a*) has successfully completed (132*cc*) its Wifi L3 test using its lock on frequency Channel 6, Slot 5 (110*a*) releases (132*c*) its lock on frequency Channel 6 and sends information on test completion to central resource control server 102. Now, central resource control server 102 is free to grant multiple locks on a given Channel for Wifi L2 tests or a single lock for a Wifi L3 test per channel (since Wifi L3 test must run alone per Channel) in response to requests for locks from slots on test station 100.

Figure 7:
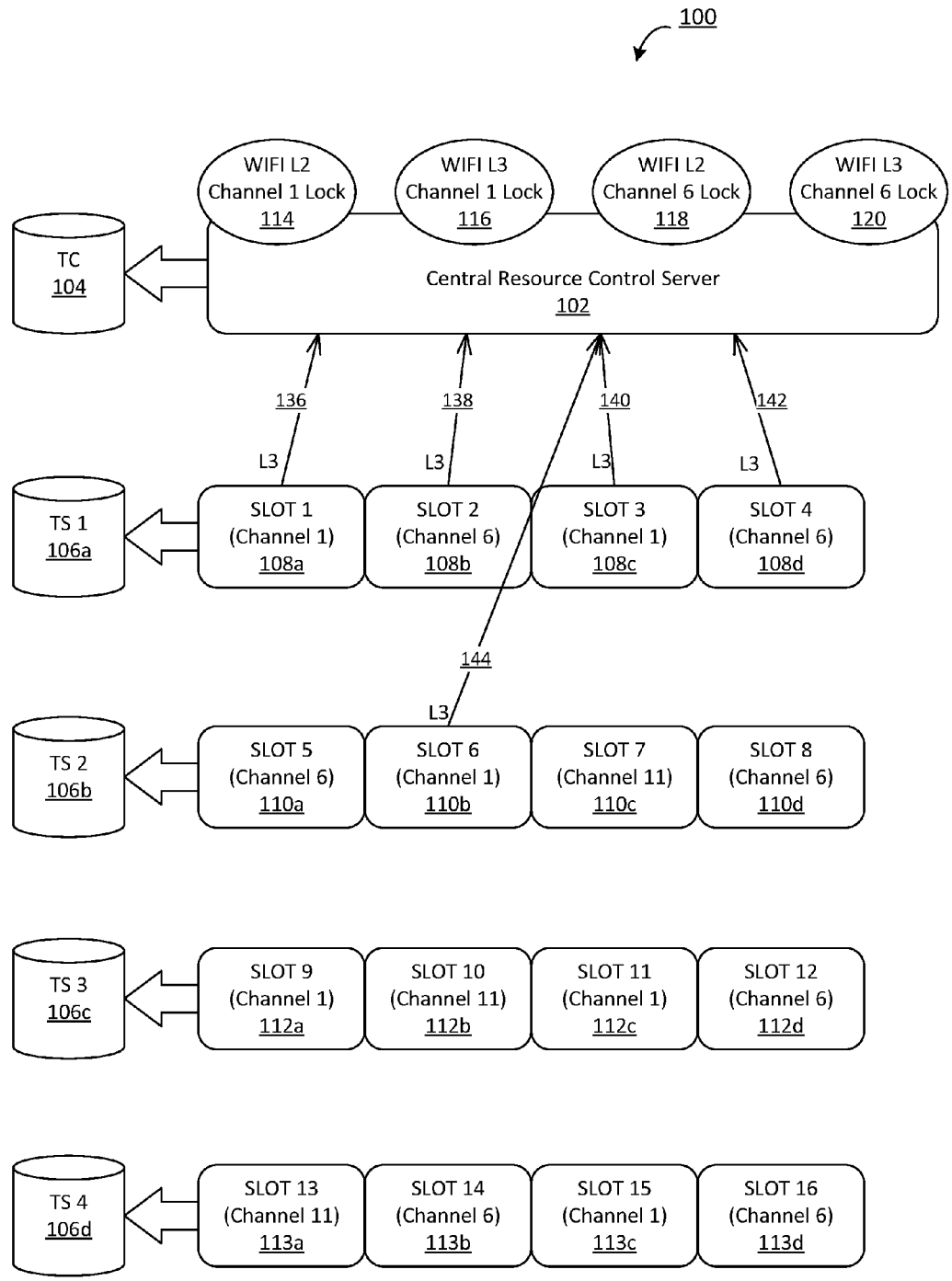
FIG. 7 illustrates the requests from multiple slots for locks on frequency Channels in order to perform respective Wifi L3 tests, according to certain embodiments.

FIG. 7 illustrates the requests from multiple slots for locks on Channels in order to perform respective Wifi L3 tests, according to certain embodiments. FIG. 7 shows that after performing one or more Wifi L2 tests successfully (a slot may need to perform more than one Wifi L2 test, for example), a given slot can proceed to perform a Wifi L3 test, if desired.

In FIG. 7, Slot 1 (108*a*) requests (136) a lock on frequency Channel 1 in order to perform a Wifi L3 test on a device installed in Slot 1 for testing. Slot 2 (108*b*) requests (138) a lock on frequency Channel 6 in order to perform a Wifi L3 test on a device installed in Slot 2 for testing. Slot 3 (108*c*) requests (140) a lock on frequency Channel 1 in order to perform a Wifi L3 test on a device installed in Slot 3 for testing. Slot 4 (108*d*) requests (142) a lock on frequency Channel 6 in order to perform a Wifi L3 test on a device installed in Slot 4 for testing. Slot 6 (110*b*) requests (144) a lock on frequency Channel 1 in order to perform a Wifi L3 test on a device installed in Slot 6 for testing. The above requests from the slots for locks on frequency Channels are sent to central resource control server 102. According to certain embodiments, central resource control server 102 will grant only one lock per frequency Channel for Wifi L3 tests in order to ensure minimum wireless interference per frequency Channel when several Wifi tests are run at the same time using various frequency Channels, as described further herein with reference to FIG. 8.

Figure 8:
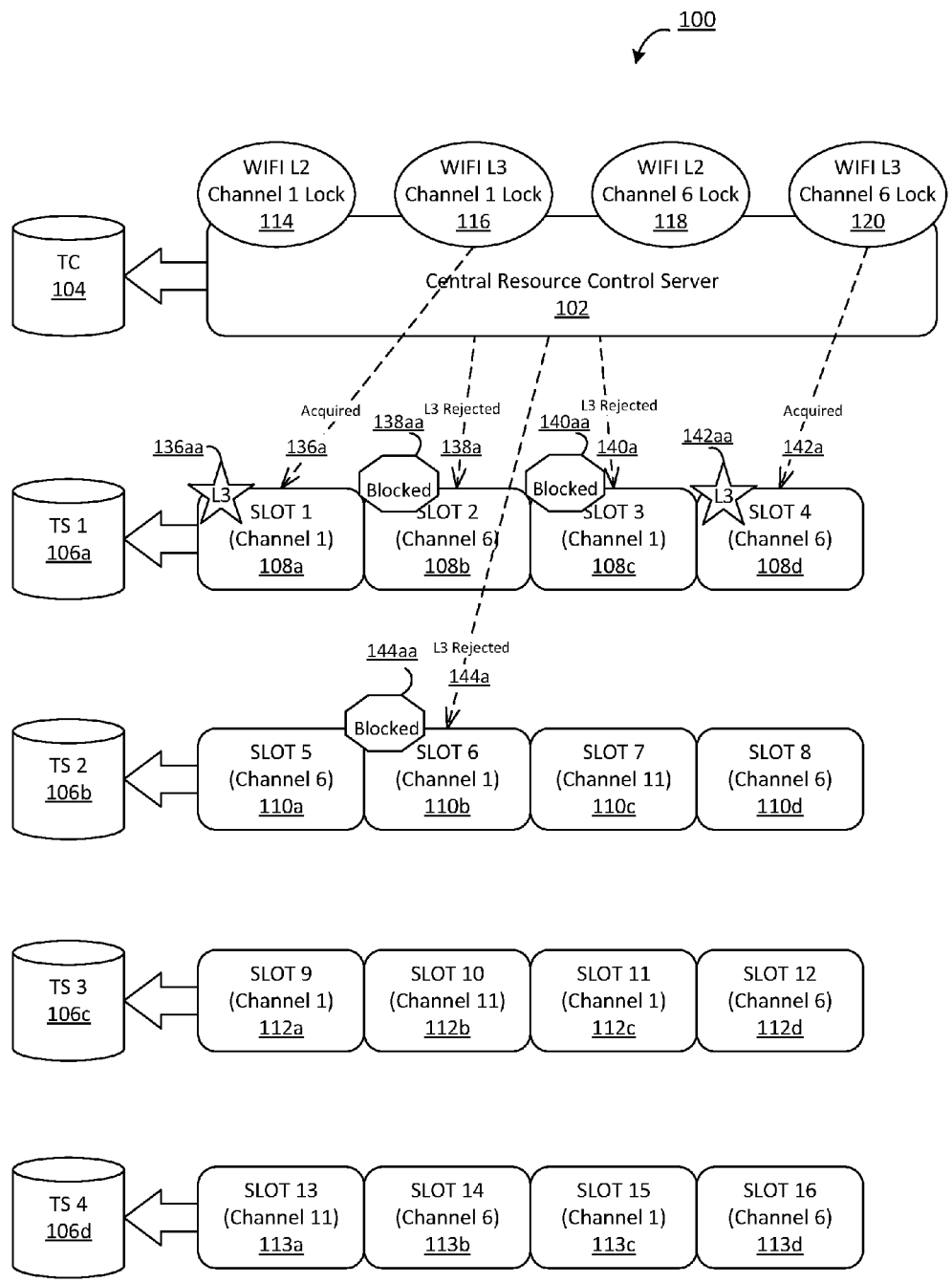
FIG. 8 illustrates that central resource control server will grant only one lock per frequency Channel for Wifi L3 tests, according to certain embodiments.

FIG. 8 illustrates that the central resource control server will grant only one lock per frequency Channel for Wifi L3 tests, according to certain embodiments. FIG. 8 shows that central resource control server 102 grants (136*a*), to Slot 1 (108*a*), a lock (136*aa*) on frequency Channel 1 so that Slot 1 (108*a*) can perform a Wifi L3 test on a device installed in Slot 1 for testing. FIG. 8 also shows that central resource control server 102 grants (142*a*), to Slot 4 (108*d*), a lock (142*aa*) on frequency Channel 6 so that Slot 4 (108*d*) can perform a Wifi L3 test on a device installed in Slot 4 for testing. Since only one Wifi L3 test can be run per frequency Channel and central resource control server 102 has already granted one lock on Channel 1 and one lock on Channel 6 for Wifi L3 tests, central resource control server 102 rejects (138*a*, 140*a*, 144*a*) the respective requests of Slot 2 (108*b*), Slot 3 (108*c*) and Slot 6 (110*b*). Thus, such requested locks are blocked (138*aa*, 140*aa*, 144*aa*). According to certain embodiments, central resource control server 102 grants requests for locks on frequency Channels on a first-come-first-served basis. According to certain other embodiments, central resource control server 102 grants requests for locks on frequency Channels based on business rules. Since Slot 2 (108*b*), Slot 3 (108*c*) and Slot 6 (110*b*) were denied locks for their respective Wifi L3 tests, Slot 2 (108*b*), Slot 3 (108*c*) and Slot 6 (110*b*) need to request again for locks for their respective Wifi L3 tests from central resource control server 102 at a later time as described with reference to FIG. 9 herein.

Figure 9:
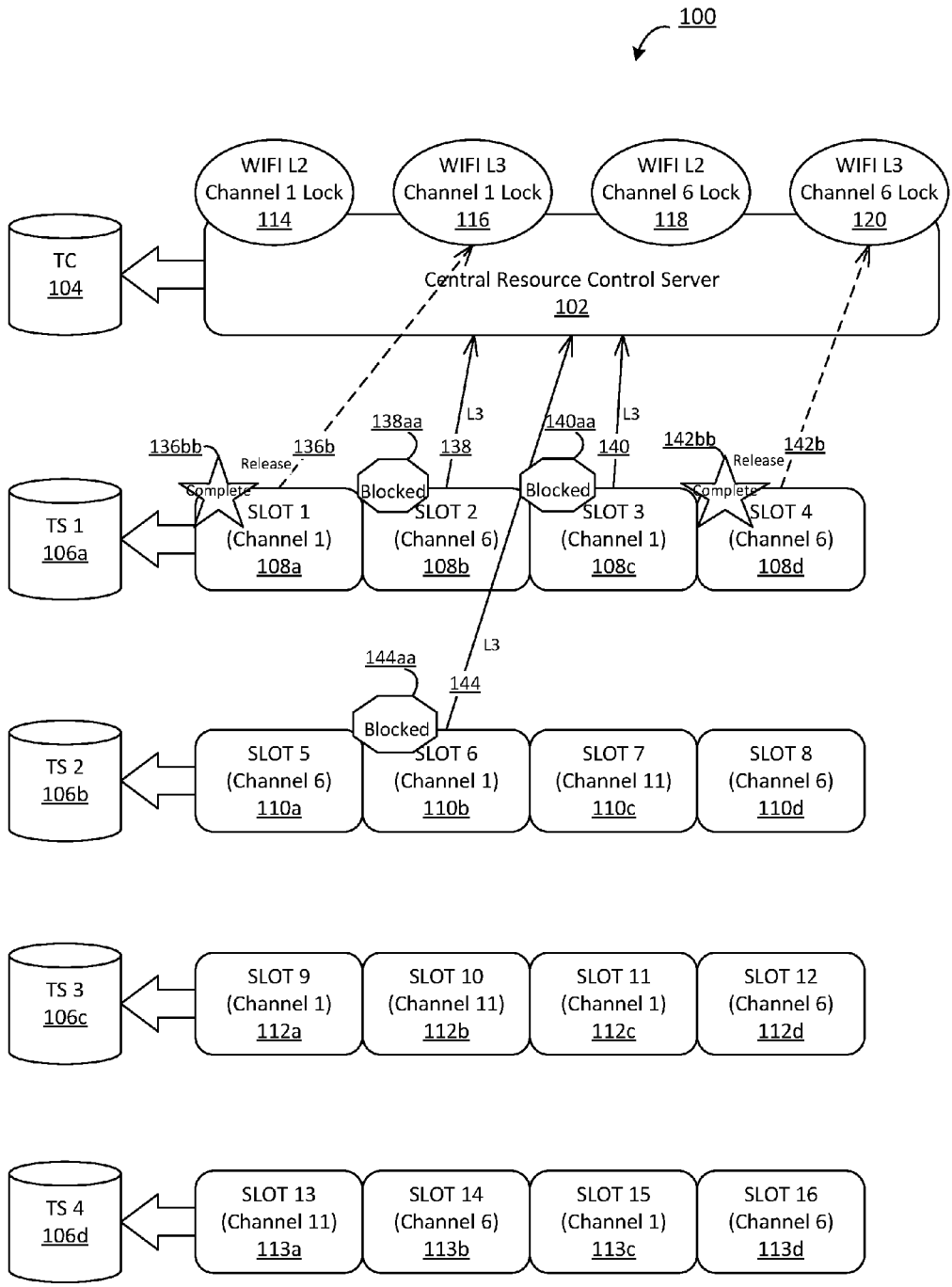
FIG. 9 illustrates the release of locks on a frequency Channels after completion of Wifi L3 tests, according to certain embodiments.

FIG. 9 illustrates the release of locks on a frequency Channels after completion of Wifi L3 tests, according to certain embodiments. FIG. 9 shows that once Slot 1 (108*a*) has successfully completed (136*bb*) its Wifi L3 test using its lock on frequency Channel 1, Slot 1 (108*a*) releases (136*b*) its lock on frequency Channel 1 and sends information on test completion to central resource control server 102. Similarly, when Slot 4 (108*c*) has successfully completed (142*bb*) its Wifi L3 test using its lock on frequency Channel 6, Slot 4 (108*d*) releases (142*b*) its lock on frequency Channel 6 and sends information on test completion to central resource control server 102. Now, central resource control server 102 can grant locks on Channel 1 and Channel 6 respectively for Wifi L3 tests to slots that request such locks. Also, since no Wifi L3 tests are running, central resource control server 102 can grant multiple locks on the frequency Channels for Wifi L2 tests (if needed) in response to requests for locks from slots on test station 100. Since Slot 2 (108*b*), Slot 3 (108*c*) and Slot 6 (110*b*) were previously denied locks for their respective Wifi L3 tests, Slot 2 (108*b*), Slot 3 (108*c*) and Slot 6 (110*b*) can now request (138, 140, 144) for locks for their respective Wifi L3 tests from central resource control server 102, according to certain embodiments.

Figure 10:
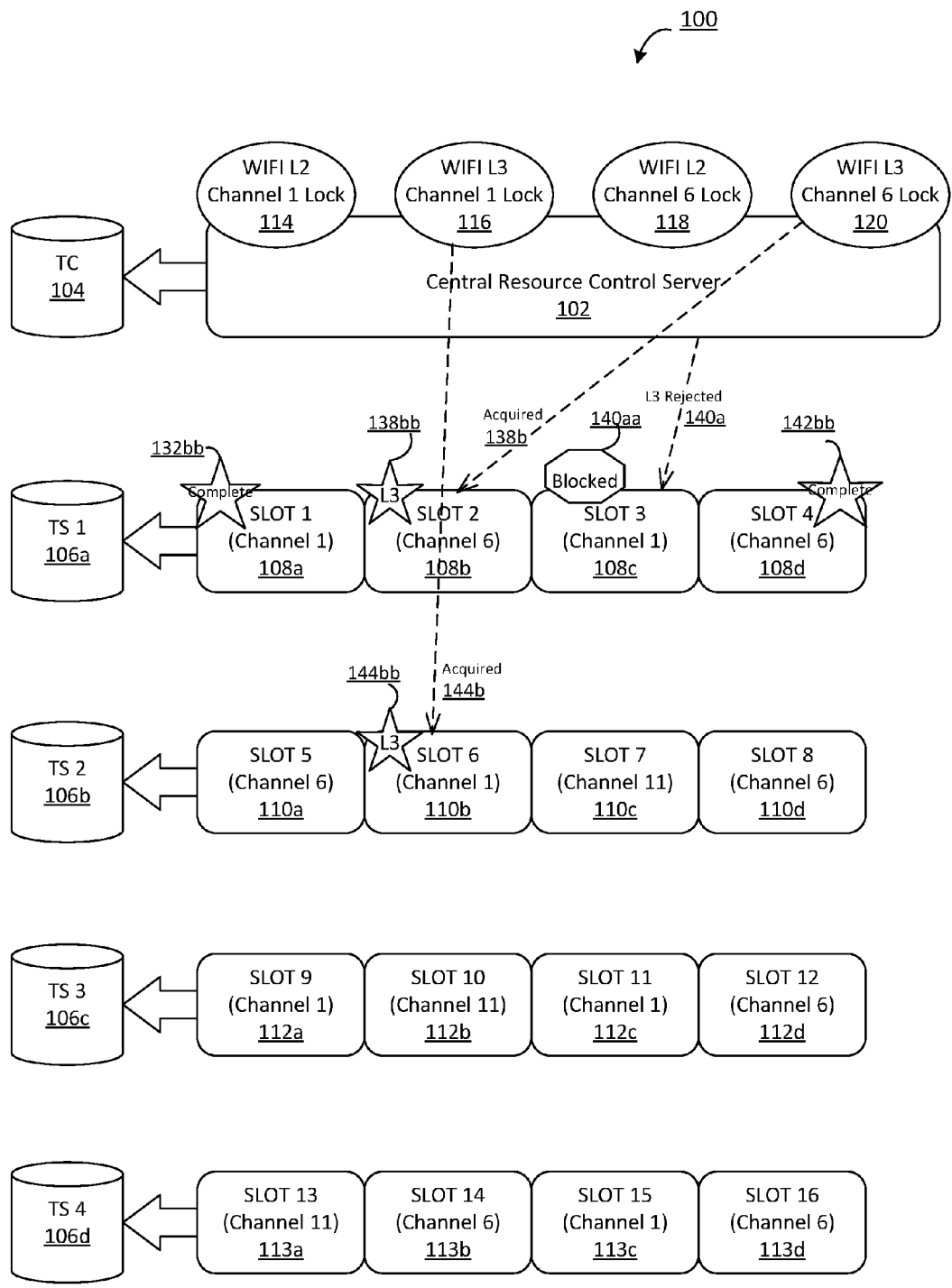
FIG. 10 illustrates the grant of a recently released lock on a frequency Channel to the next slot request in the queue, according to certain embodiments.

FIG. 10 illustrates the grant of a recently released lock on a frequency Channel to the next slot request in the queue, according to certain embodiments. Continuing with the above example of FIG. 8 and FIG. 9. As explained with reference to FIG. 8, when Slot 1 (108*a*) and Slot 4 (108*d*) release their respective locks on frequency Channel 1 and Channel 6 respectively, central resource control server 102 can grant L3 locks to the next request for an L3 lock per frequency Channel. As previously described with reference to FIG. 8, the requests for L3 locks from Slot 2 (108*b*), Slot 3 (108*c*) and Slot 6 (110*b*) were denied. Assume that the request for an L3 lock on Channel 1 from Slot 6 (110*b*) precedes the request for an L3 lock on Channel 1 from Slot 3 (108*c*). Thus, central resource control server 102 grants (144*b*) Slot 6 (110*b*) a lock (144*bb*) on Channel 1 for its Wifi L3 test while denying (140*a*) the request from Slot 3 (108*c*) for an L3 lock (blocked 140*aa*) on Channel 1. Further, central resource control server 102 grants (138*b*) to Slot 2 (110*b*) a lock (138*bb*) on Channel 6 for its Wifi L3 test since there is no other pending L3 lock or pending L2 lock on Channel 6, according to certain embodiments.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A testing machine for testing a plurality of devices, the testing machine comprising:
   a plurality of slots, wherein:
      each slot of at least a subset of the plurality of slots is designed for installing a corresponding device of the plurality of devices to be tested;
      each slot of the subset of the plurality of slots is assigned a respective wireless frequency channel for performing one or more wireless tests on each slot's corresponding installed device to be tested;
   at least one central resource control server, wherein:
      the at least one central resource control server controls locking of a plurality of wireless frequency channels;
      a respective slot of the subset of the plurality of slots sends a request, to the at least one central resource control server, for a lock on the respective slot's assigned frequency channel when the respective slot needs to perform a wireless test on the respective slot's corresponding installed device to be tested;
      the at least one central resource control server grants the request for the lock on the respective slot's assigned frequency channel based on a predetermined set of criteria.

2. The testing machine of claim 1, wherein the predetermined set of criteria comprises: granting a lock on a respective frequency channel for performing Layer 2 wireless tests only if all previously granted locks on the respective frequency channel for performing Layer 3 wireless tests are released.

3. The testing machine of claim 1, wherein the predetermined set of criteria comprises: granting a lock on a respective frequency channel for performing Layer 3 wireless tests only if all previously granted locks on the respective frequency channel for performing any wireless tests are released.

4. The testing machine of claim 1, wherein the predetermined set of criteria comprises: granting a lock on a respective frequency channel for performing wireless tests based on a first-come-first-served basis.

5. The testing machine of claim 1, wherein the predetermined set of criteria comprises: granting a lock on a respective frequency channel for performing wireless tests based on business rules.

6. The testing machine of claim 1, further comprises a test control computer that is associated with the at least one central resource control server.

* * * * *